US00RE50188E

(19) United States
(12) Reissued Patent
Li et al.

(10) Patent Number: US RE50,188 E
(45) Date of Reissued Patent: Oct. 29, 2024

(54) CAMERA

(71) Applicant: Elo Touch Solutions, Inc., Knoxville, TN (US)

(72) Inventors: Yexia Li, Shanghai (CN); Jinwei Zhang, Shanghai (CN); Jinfeng Zhang, Shanghai (CN)

(73) Assignee: Elo Touch Solutions, Inc., Knoxville, TN (US)

(21) Appl. No.: 29/900,181

(22) Filed: Aug. 17, 2023

Related U.S. Patent Documents

Reissue of:
(64) Patent No.: Des. 954,778
Issued: Jun. 14, 2022
Appl. No.: 35/511,214
Filed: Dec. 30, 2020

(30) Foreign Application Priority Data

Jul. 3, 2020 (CN) ..... 202030353223.2

(51) LOC (14) Cl. ..... 16-01
(52) U.S. Cl.
USPC ..... D16/202
(58) Field of Classification Search
USPC ..... D16/200, 202, 203, 207; D10/57; D14/214
CPC ..... G03B 17/02; G03B 19/04; G03B 17/56; G03B 17/04; G03B 15/03
See application file for complete search history.

(56) References Cited

U.S. PATENT DOCUMENTS

D496,677 S * 9/2004 Maeno ..... D16/208
D586,835 S * 2/2009 Koza ..... D16/202
D629,031 S * 12/2010 Su ..... D16/202
D781,263 S * 3/2017 Tong ..... D14/204
D795,940 S * 8/2017 Huang ..... D16/203
D838,303 S * 1/2019 Brunner ..... D16/202
(Continued)

OTHER PUBLICATIONS

Elo Touch Solutions, Inc.; Elo Temperature Sensor Pro; https://www.elotouch.com/accessories-temperature-sensor-pro.html; available online Sep. 29, 2020.*

*Primary Examiner* — Philip S Hyder
(74) *Attorney, Agent, or Firm* — Sterne, Kessler, Goldstein & Fox P.L.L.C.

(57) CLAIM

The ornamental design for a camera, as shown and described.

DESCRIPTION

[1. Camera
1.1 : Top
1.2 : Back
1.3 : Perspective
1.4 : Bottom
1.5 : Right
1.6 : Front
1.7 : Left]

*FIG. 1 is a top front perspective view of a camera showing the claimed design;*
*FIG. 2 is a front elevation view thereof;*
*FIG. 3 is a rear elevation view thereof;*
*FIG. 4 is a top plan view thereof;*
*FIG. 5 is a bottom plan view thereof;*
*FIG. 6 is a left side elevation view thereof; and,*
*FIG. 7 is right side elevation a view thereof.*
*The dot-dash broken lines in the figures and the area(s) within the dot-dash broken lines show portions of the camera that form no part of the claimed design.*

1 Claim, 7 Drawing Sheets

Matter enclosed in heavy brackets [ ] appears in the original patent but forms no part of this reissue; matter printed in italics indicates the additions made by reissue.

[AMENDED]

(56) References Cited

U.S. PATENT DOCUMENTS

| | | | | | |
|---|---|---|---|---|---|
| D849,089 | S | * | 5/2019 | Lu | D16/202 |
| D861,055 | S | * | 9/2019 | Sekine | D16/200 |
| D870,790 | S | * | 12/2019 | Depay | D16/202 |
| D881,972 | S | * | 4/2020 | Guo | D16/202 |
| D897,992 | S | * | 10/2020 | Chan | D14/214 |
| D901,570 | S | * | 11/2020 | Hao | D16/202 |
| D907,090 | S | * | 1/2021 | Zheng | D16/202 |
| D912,717 | S | * | 3/2021 | Russo | D16/202 |
| D931,927 | S | * | 9/2021 | Russo | D16/202 |
| D936,122 | S | * | 11/2021 | Wang | D16/202 |
| D958,675 | S | * | 7/2022 | Liu | D10/57 |

* cited by examiner

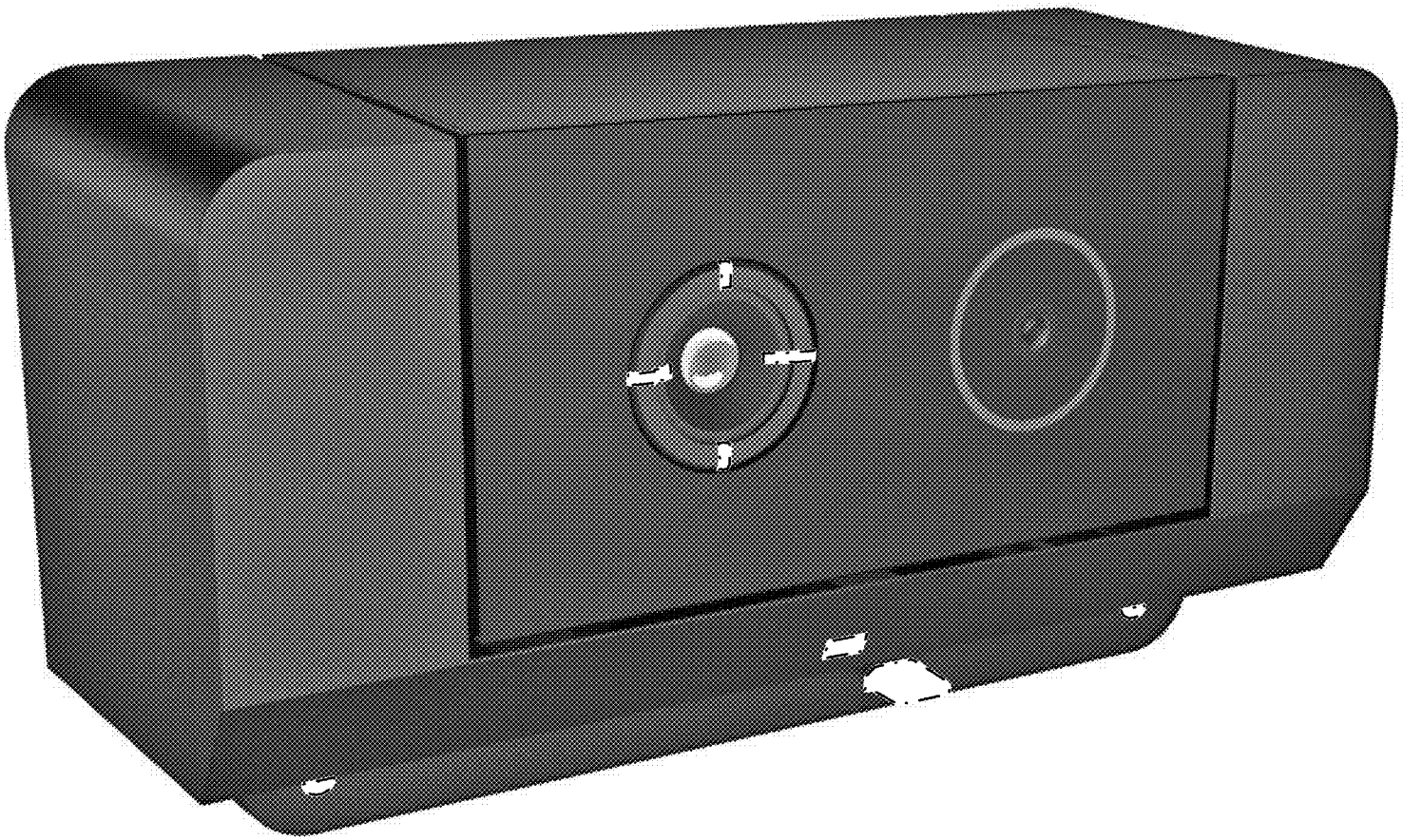
FIG. 1 [AMENDED]

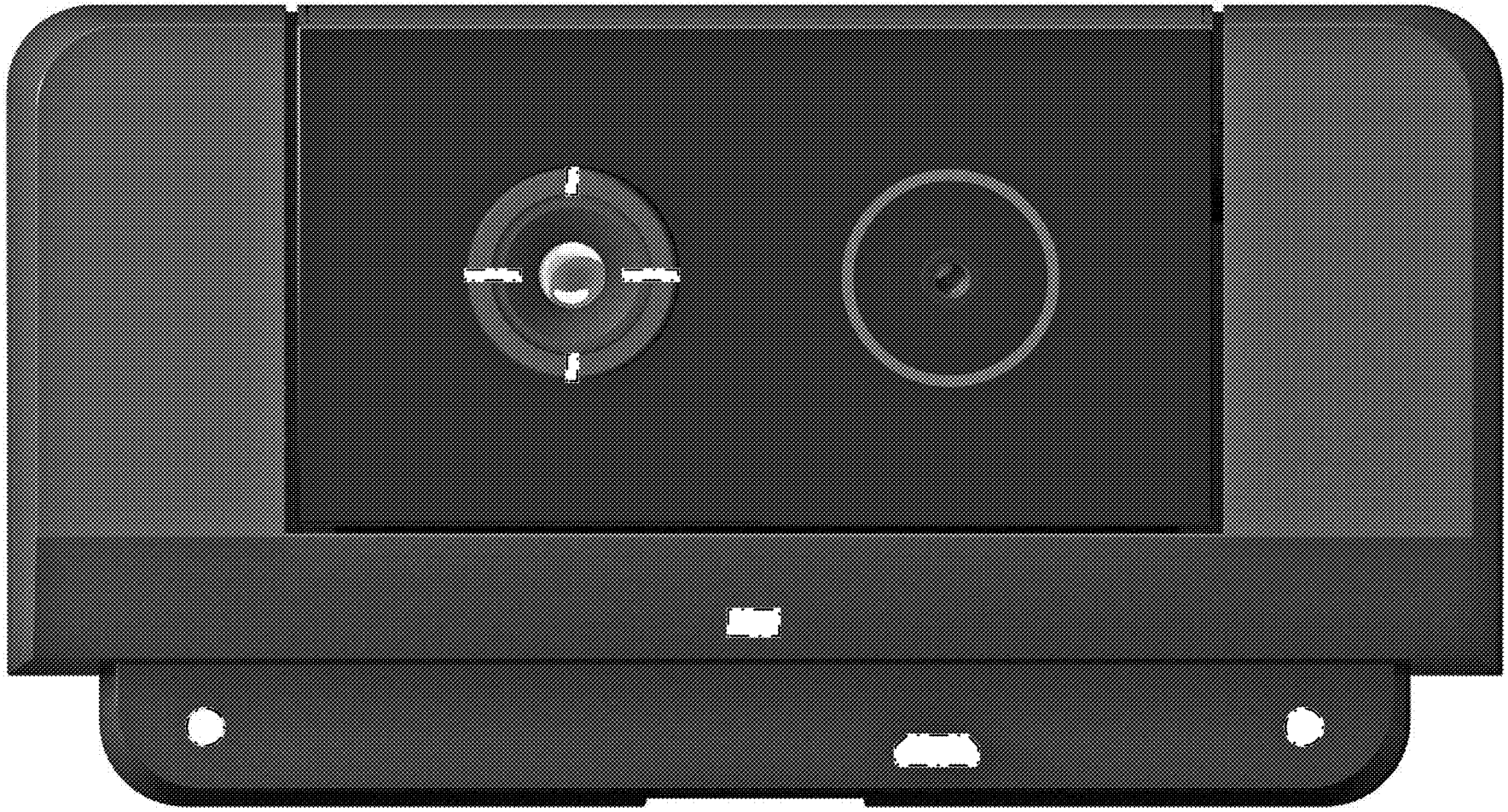
FIG. 2 [AMENDED]

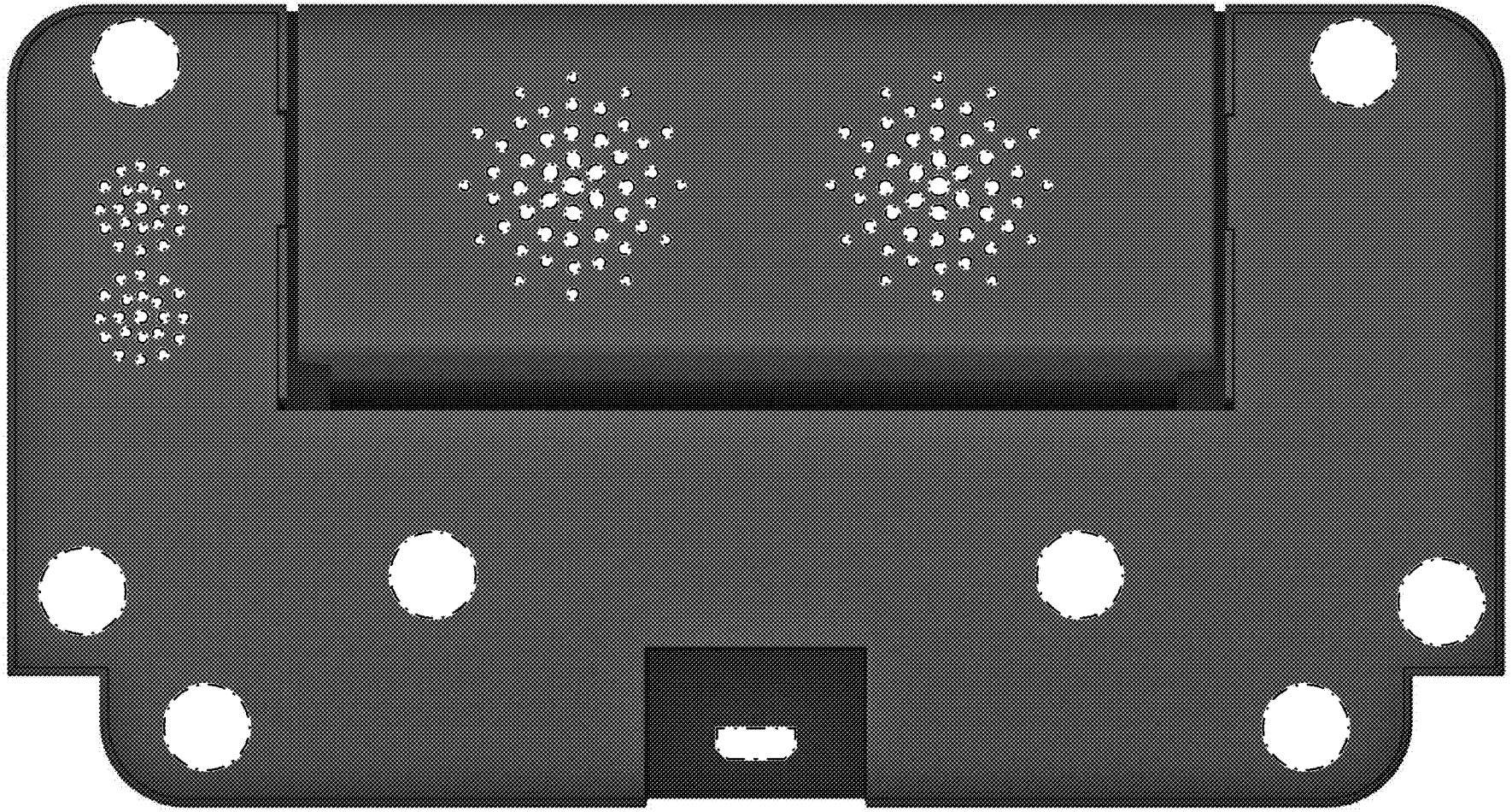
FIG. 3 [AMENDED]

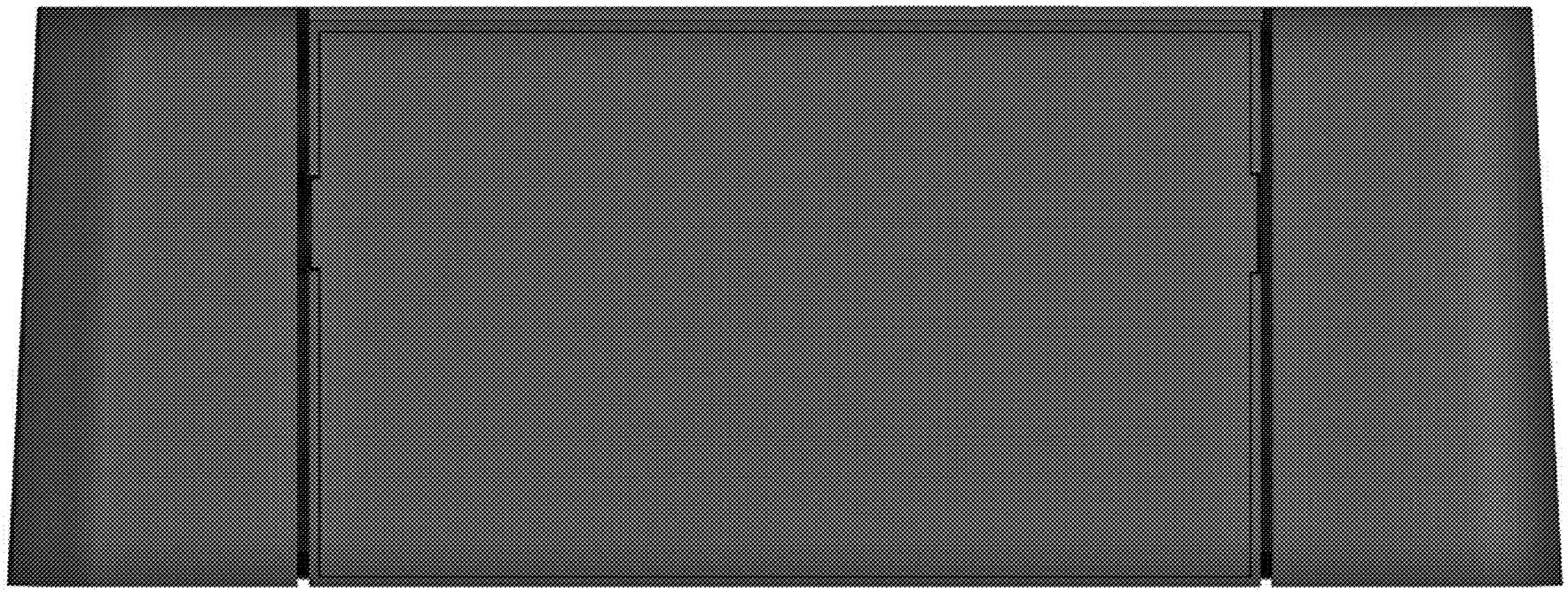
FIG. 4 [AMENDED]

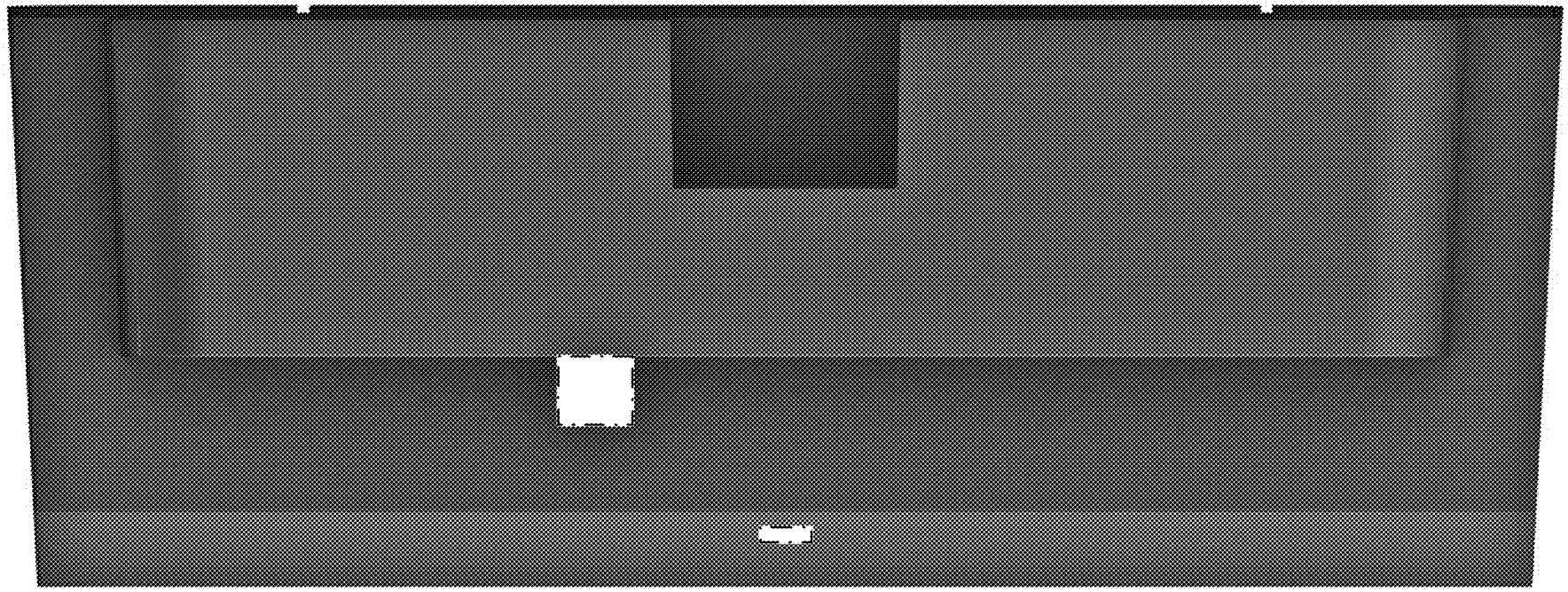
FIG. 5 [AMENDED]

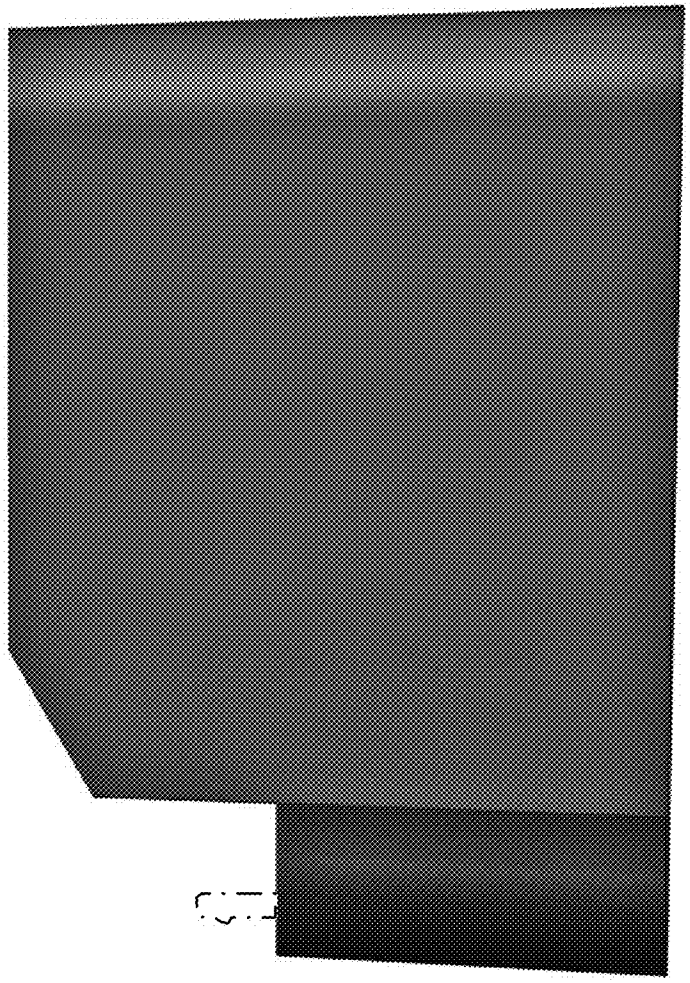
FIG. 6 [AMENDED]

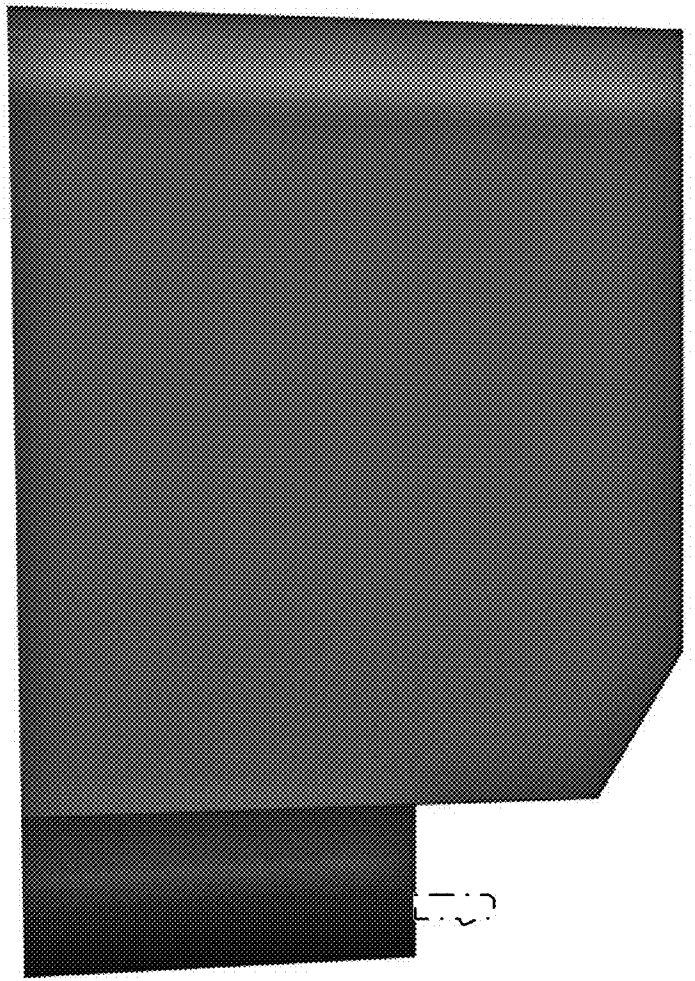
FIG. 7 [AMENDED]